United States Patent
Li et al.

(10) Patent No.: US 11,631,399 B2
(45) Date of Patent: Apr. 18, 2023

(54) LAYER TRAJECTORY LONG SHORT-TERM MEMORY WITH FUTURE CONTEXT

(71) Applicant: Microsoft Technology Licensing, LLC, Redmond, WA (US)

(72) Inventors: Jinyu Li, Redmond, WA (US); Vadim Mazalov, Issaquah, WA (US); Changliang Liu, Bothell, WA (US); Liang Lu, Redmond, WA (US); Yifan Gong, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 907 days.

(21) Appl. No.: 16/410,659

(22) Filed: May 13, 2019

(65) Prior Publication Data
US 2020/0334526 A1   Oct. 22, 2020

Related U.S. Application Data

(60) Provisional application No. 62/834,622, filed on Apr. 16, 2019.

(51) Int. Cl.
*G10L 15/16* (2006.01)
*G10L 15/22* (2006.01)
*G10L 15/183* (2013.01)

(52) U.S. Cl.
CPC ............ *G10L 15/16* (2013.01); *G10L 15/183* (2013.01); *G10L 15/22* (2013.01)

(58) Field of Classification Search
CPC ...................................................... G10L 15/16
See application file for complete search history.

(56) References Cited

U.S. PATENT DOCUMENTS

| 2012/0065976 | A1* | 3/2012 | Deng | ................ | G06N 3/084 |
| | | | | | 704/256.1 |
| 2014/0257803 | A1* | 9/2014 | Yu | ..................... | G10L 15/16 |
| | | | | | 704/232 |

(Continued)

OTHER PUBLICATIONS

Yu, Dong, Li Deng, and Frank Seide. "The deep tensor neural network with applications to large vocabulary speech recognition." IEEE Transactions on audio, speech, and language processing 21.2 (2012): 388-396. (Year: 2012).*

(Continued)

*Primary Examiner* — Jialong He
(74) *Attorney, Agent, or Firm* — Workman Nydegger

(57) ABSTRACT

According to some embodiments, a machine learning model may include an input layer to receive an input signal as a series of frames representing handwriting data, speech data, audio data, and/or textual data. A plurality of time layers may be provided, and each time layer may comprise a uni-directional recurrent neural network processing block. A depth processing block may scan hidden states of the recurrent neural network processing block of each time layer, and the depth processing block may be associated with a first frame and receive context frame information of a sequence of one or more future frames relative to the first frame. An output layer may output a final classification as a classified posterior vector of the input signal. For example, the depth processing block may receive the context from information from an output of a time layer processing block or another depth processing block of the future frame.

22 Claims, 13 Drawing Sheets

(56) References Cited

U.S. PATENT DOCUMENTS

| | | | | |
|---|---|---|---|---|
| 2014/0372112 | A1* | 12/2014 | Xue | G06N 3/0454 704/232 |
| 2017/0161256 | A1* | 6/2017 | Hori | G06N 3/0472 |
| 2018/0174576 | A1* | 6/2018 | Soltau | G10L 21/10 |
| 2019/0051291 | A1* | 2/2019 | Yoo | G06N 3/0454 |

OTHER PUBLICATIONS

"International Search Report and Written Opinion Issued in PCT Application No. PCT/US20/020584", dated Jun. 16, 2020, 9 Pages.

Li, et al., "LSTM Time and Frequency Recurrence for Automatic Speech Recognition", In Proceedings of the IEEE Workshop on Automatic Speech Recognition and Understanding, Dec. 1, 2015, 5 Pages.

Das, et al., "Advancing Connectionist Temporal Classification with Attention Modeling", In Proceedings of the International Conference on Acoustics, Speech and Signal Processing, Mar. 15, 2018, 5 Pages.

Deng, et al., "Recent Advances in Deep Learning for Speech Research at Microsoft", In Proceedings of the IEEE International Conference on Acoustics, Speech and Signal Processing, May 26, 2013, 5 Pages.

Goodfellow, et al., "Maxout Networks", In Proceedings of the 30th International Conference on Machine Learning, Jul. 2013, 9 Pages.

Graves, et al., "Speech Recognition with Deep Recurrent Neural Networks", In Proceedings of the IEEE International Conference on Acoustics, Speech and Signal Processing, May 26, 2013, pp. 6645-6649.

Hinton, et al., "Deep Neural Networks for Acoustic Modeling in Speech Recognition: The Shared Views of Four Research Groups", In Proceedings of the IEEE Signal Processing Magazine, vol. 29, Issue 6, Nov. 1, 2012, pp. 82-97.

Hochreiter, et al., "Long Short-Term Memory", In Journal of Neural Computation, vol. 9, Issue 8, Nov. 15, 1997, 32 Pages.

Hsu, et al., "A Prioritized Grid Long Short-Term Memory RNN for Speech Recognition", In Proceedings of the IEEE Spoken Language Technology Workshop, Dec. 13, 2016, 7 Pages.

Jaitly, et al., "Application of Pretrained Deep Neural Networks to Large Vocabulary Speech Recognition", In Proceedings of the 13th Annual Conference of the International Speech Communication Association, Sep. 9, 2012, 4 Pages.

Kalchbrenner, et al., "Grid Long Short-Term Memory", In Proceedings of the International Conference on Learning Representations, Jul. 6, 2015, 15 Pages.

Kim, et al., "Residual LSTM: Design of a Deep Recurrent Architecture for Distant Speech Recognition", In Proceedings of the 18th Annual Conference of the International Speech Communication Association, Jan. 10, 2017, 5 Pages.

Li, et al., "Constructing Long Short-Term Memory Based Deep Recurrent Neural Networks for Large Vocabulary Speech Recognition", In Proceedings of the IEEE International Conference on Acoustics, Speech and Signal Processing, Apr. 19, 2015, 5 Pages.

Li, et al., "Exploring Layer Trajectory LSTM with Depth Processing Units and Attention", In Proceedings of the IEEE Spoken Language Technology Workshop, Dec. 1, 2018.

Li, et al., "Exploring Multidimensional LSTMs for Large Vocabulary ASR", In Proceedings of the IEEE International Conference on Acoustics, Speech and Signal Processing, Mar. 1, 2016, 5 Pages.

Li, et al., "Gated Recurrent Unit Based Acoustic Modeling with Future Context", In Proceedings of the 19th Annual Conference of the International Speech Communication Association, Sep. 2, 2018, 5 Pages.

Li, et al., "Layer Trajectory LSTM", In Proceedings of the 19th Annual Conference of the International Speech Communication Association, Sep. 2, 2018, 5 Pages.

Li, et al., "Reducing the Computational Complexity of Two-Dimensional LSTMs", In Proceedings of the 18th Annual Conference of the International Speech Communication Association, Aug. 20, 2017, pp. 964-968.

Miao, et al., "Deep Maxout Networks for Low-Resource Speech Recognition", In Proceedings of the IEEE Workshop an Automatic Speech Recognition and Understanding, Dec. 1, 2013, 6 Pages.

Miao, et al., "On Speaker Adaptation of Long Short-Term Memory Recurrent Neural Networks", In Proceedings of the Sixteenth Annual Conference of the International Speech Communication Association, Sep. 6, 2015, 5 Pages.

Miao, et al., "Simplifying Long Short-Term Memory Acoustic Models for Fast Training and Decoding", In Proceedings of the IEEE International Conference on Acoustics, Speech and Signal Processing, Mar. 20, 2016, pp. 2284-2288.

Peddinti, et al., "A Time Delay Neural Network Architecture for Efficient Modeling of Long Temporal Contexts", In Proceedings of the Sixteenth Annual Conference of the International Speech Communication Association, Sep. 6, 2015, pp. 3214-3218.

Pundak, et al., "Highway-LSTM and Recurrent Highway Networks for Speech Recognition", In Proceedings of the 18th Annual Conference of the International Speech Communication Association, Aug. 20, 2017, 5 Pages.

Sainath, et al., "Convolutional, Long Short-Term Memory, Fully Connected Deep Neural Networks", In Proceedings of the IEEE International Conference on Acoustics, Speech and Signal Processing, Apr. 19, 2015, 5 Pages.

Sainath, et al., "Making Deep Belief Networks Effective for Large Vocabulary Continuous Speech Recognition", In Proceedings of the IEEE Workshop on Automatic Speech Recognition and Understanding, Dec. 11, 2011, pp. 30-35.

Sainath, et al., "Modeling Time-Frequency Patterns with LSTM vs. Convolutional Architectures for LVCSR Tasks", In Proceedings of IEEE International Conference on Acoustics, Speech and Signal Processing, Sep. 2016, 5 Pages.

Sak, et al., "Long Short-Term Memory Recurrent Neural Network Architectures for Large Scale Acoustic Modeling", In Proceedings of the Fifteenth Annual Conference of the International Speech Communication Association, 2014, 5 Pages.

Sak, et al., "Sequence Discriminative Distributed Training of Long Short-Term Memory Recurrent Neural Networks", In Proceedings of the 15th Annual Conference of the International Speech Communication Association, Sep. 14, 2014, pp. 1209-1213.

Swietojanski, et al., "Investigation of Maxout Networks for Speech Recognition", In Proceedings of the IEEE International Conference on Acoustics, Speech and Signal Processing, May 4, 2014, 5 Pages.

Yu, et al., "Recent Progresses in Deep Learning Based Acoustic Models", In IEEE/CAA Journal of Automatica Sinica, vol. 4, Issue 3, Jul. 2017, pp. 400-413.

Yu, et al., "Roles of Pre-Training and Fine-Tuning in Context-Dependent DBN-HMMs for Realworld Speech Recognition", In Proceedings of the NIPS Workshop on Deep Learning and Unsupervised Feature Learning, Dec. 1, 2010, 8 Pages.

Zhang, et al., "Highway Long Short-Term Memory rnns for Distant Speech Recognition", In Proceedings of the IEEE International Conference on Acoustics, Speech and Signal Processing, Jan. 11, 2016, 5 Pages.

Zhang, et al., "Nonrecurrent Neural Structure for Long-Term Dependence", In Proceedings of the IEEE/ACM Transactions on Audio, Speech and Language Processing, vol. 25, Issue 4, Apr. 2017, pp. 871-884.

Zhao, et al., "Multidimensional Residual Learning Based on Recurrent Neural Networks for Acoustic Modeling", In Proceedings of the 17th Annual Conference of the International Speech Communication Association, Sep. 8, 2016, pp. 3419-3423.

Jinyu, et al., "Improving Layer Trajectory LSTM with Future Context Frames", In Proceedings of the IEEE International Conference on Acoustics, Speech and Signal Processing, May 12, 2019, 5 Pages.

* cited by examiner

LAYER TRAJECTORY LONG SHORT-TERM MEMORY WITH FUTURE CONTEXT

CROSS-REFERENCE TO RELATED APPLICATIONS

The present application claims the benefit of U.S. Provisional Patent Application No. 62/834,622 entitled "CONTEXTUAL UNI-DIRECTIONAL LAYER TRAJECTORY LONG SHORT-TERM MEMORY MODELS" and filed Apr. 16, 2019. The entire content of that application is incorporated herein by reference.

FIELD

This application relates generally to machine learning models and in particular machine learning models with depth processing units. Such machine learning models can be applied to speech recognition, image recognition, image caption generation, machine translation, and other sequence to sequence or classification problems.

BACKGROUND

It is popular to stack recurrent neural network machine learning models, like Long Short-Term Memory ("LSTM") models, in layers to get better modeling power. However, an LSTM Recurrent Neural Network ("RNN") with too many layers may become hard to train and a so-called gradient vanishing issue may occur when the layers go too deep. Attempts have been made to solve these issues using skip connections between layers, such as with residual LSTM. Also note that uni-directional RNN modeling methods have very limited temporal modeling power. However, future context frames may carry valuable information to help predict target label evidence (e.g., as demonstrated by the success of bi-directional RNN methods).

What is needed is a system to accurately and efficiently improve the performance of ASR models.

SUMMARY

This summary is provided to introduce a selection of concepts in a simplified form that are further described below in the detailed description section. This summary is not intended to identify all key or essential features of the claimed subject matter, nor is it intended as an aid in determining the scope of the claimed subject matter.

Systems, methods, and computer readable storage devices embodying instructions for providing a machine learning model with an input layer to receive an input signal as a series of frames representing handwriting data, speech data, audio data, and/or textual data. A plurality of time layers may be provided, and each time layer may comprise a uni-directional recurrent neural network processing block. A depth processing block may scan hidden states of the recurrent neural network processing block of each time layer, and the depth processing block may be associated with a first frame and receive context frame information of a sequence of one or more future frames relative to the first frame. An output layer may output a final classification as a classified posterior vector of the input signal. For example, the depth processing block may receive the context from information from an output of a time layer processing block or another depth processing block of the future frame.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

DETAILED DESCRIPTION

The following description is provided to enable any person in the art to make and use the described embodiments. Various modifications, however, will remain readily apparent to those in the art.

Figure 1:
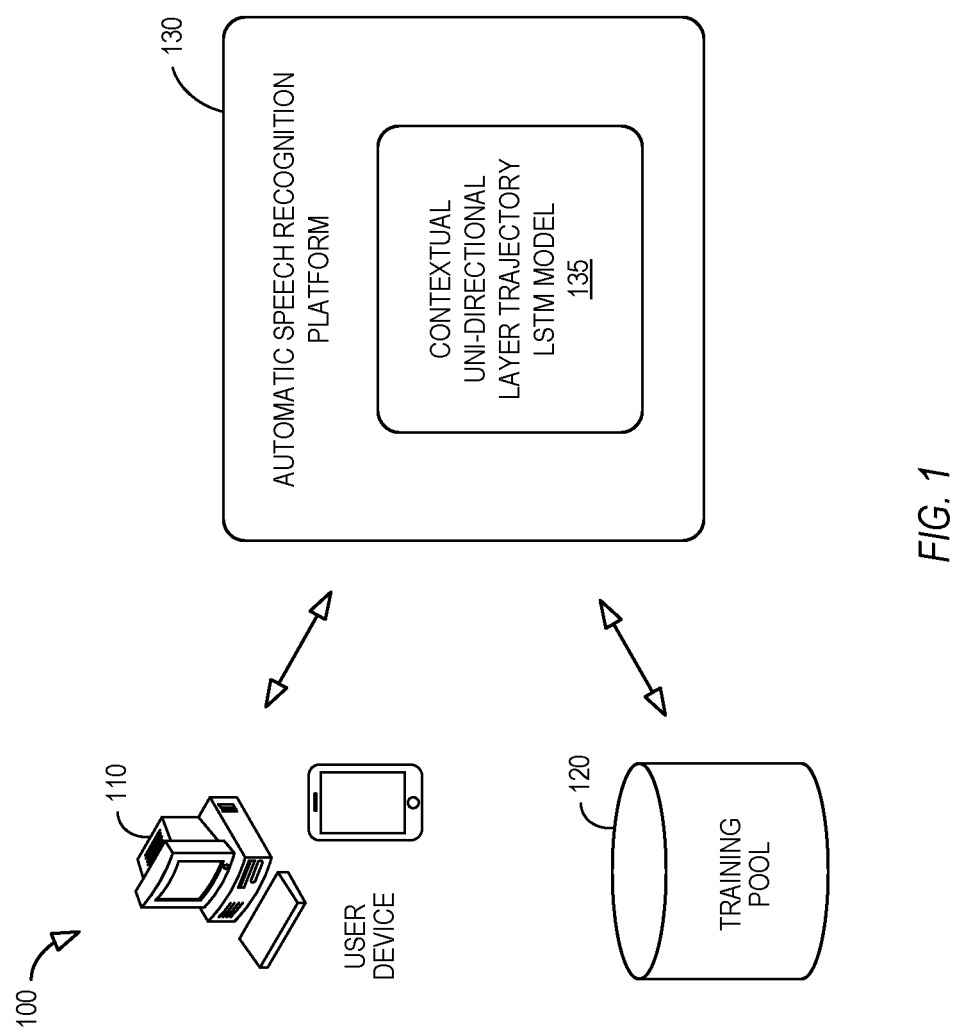
FIG. 1 is a high-level block diagram illustrating an example operating environment according to some embodiments.

FIG. 1 illustrates an example operating environment 100 in which some embodiments of the present disclosure may be practiced. As illustrated, a user device 110 may provide utterances from a user to a database maintaining a training pool 120 and/or to an ASR platform 130. The ASR platform 130 may receive utterances from the user device 110 and/or training utterances from the training pool 120 to provide a training dataset against which to train an ASR model.

The user device 110, training pool 120, and ASR platform 130 are illustrative of a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, printers, and mainframe computers. The hardware of these computing systems is discussed in greater detail in connection with FIGS. 4 through 6.

While the user device 110, training pool 120, and ASR platform 130 are shown remotely from one another for illustrative purposes, it should be noted that several configurations of one or more of these devices hosted locally to another illustrated device are possible, and each illustrated device may represent multiple instances of that device. Various servers and intermediaries familiar to those of ordinary skill in the art may lie between the component systems illustrated in FIG. 1 to route the communications between those systems, which are not illustrated so as not to distract from the novel aspects of the present disclosure.

Some embodiments of the present disclosure present mechanisms for machine learning that can be used in a variety of contexts. The mechanisms disclosed herein can be used for classification and, when combined with other aspects, become part of a system that performs sequence to sequence conversion such as speech recognition, image captioning, machine translation, and so forth. The mechanisms can also be used in any context where classification is a part of the problem to be solved.

Embodiments of the present disclosure solve the technical problems associated with time-layered LSTM models by adding a layer processing block between the LSTM layers. The layer processing block scans the outputs from the time layers and uses the summarized layer information for final classification. The forward-propagation of time-layered LSTMs and the layer processing block can be handled in two separate threads in parallel. Moreover, a contextual unidirectional layer trajectory LSTM model 135 may be employed to further enhance the accuracy of the system 100.

There has been a significant progress in Automatic Speech Recognition ("ASR") since the transition from the Deep feedforward Neural Networks ("DNNs") to Recurrent Neural Networks ("RNNs") with Long Short-Term Memory ("LSTM") units. LSTMs alleviate the gradient vanishing or exploding issues in standard RNNs by using input, output and forget gates, thus improving the capacity of the network to capture long temporal context information in audio sequences. LSTM-RNNs have been shown to outperform DNNs on a variety of ASR tasks, and considerable efforts have been devoted to improving the structure of LSTM for ASR, such as convolutional LSTM DNN ("CLDNN"), time-frequency LSTM-RNNs, grid LSTMs, residual LSTMs, highway LSTMs, etc.

Figure 2A:
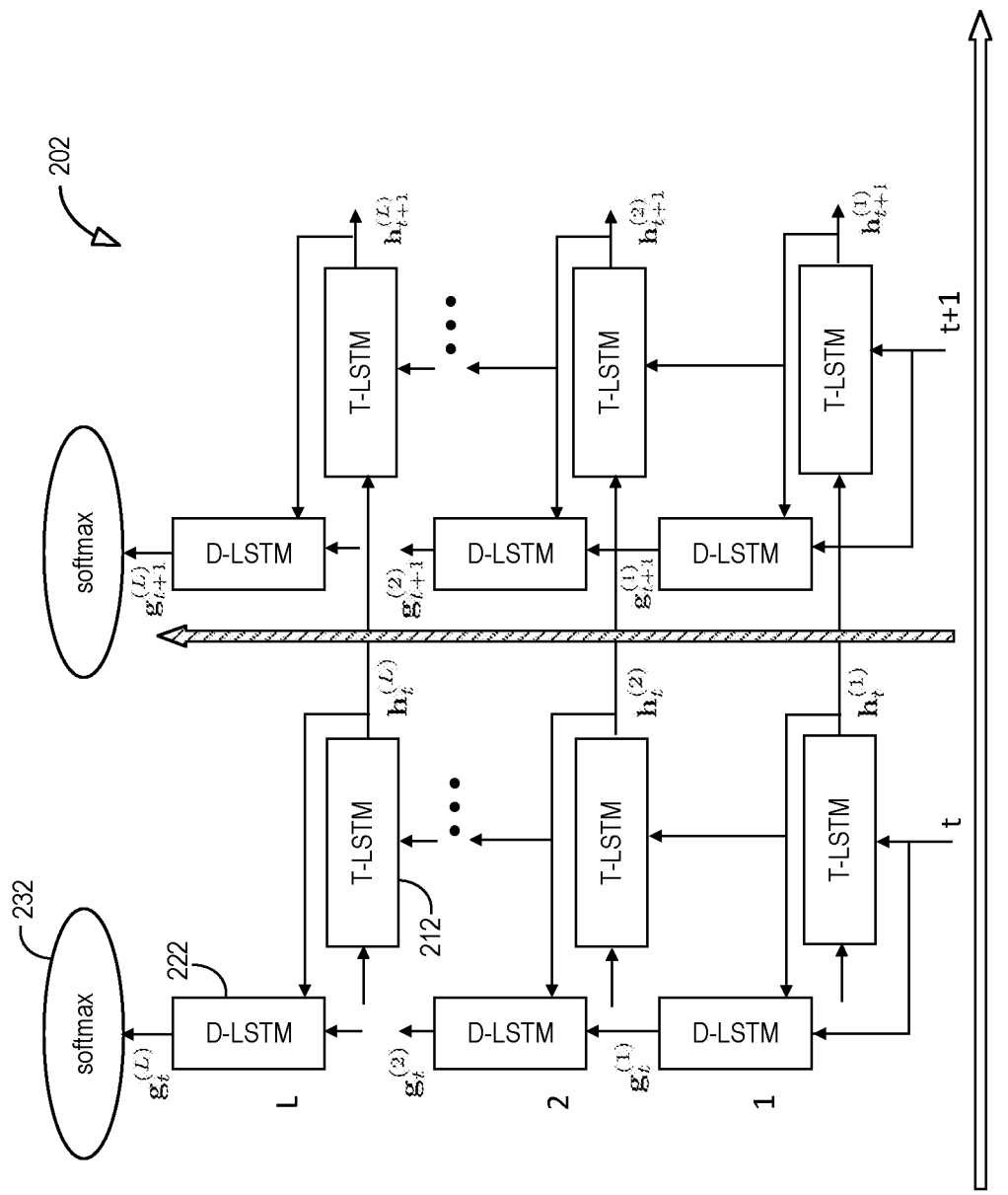
FIG. 2A is layer trajectory LSTM in accordance with some embodiments.

A layer trajectory LSTM ("ltLSTM") model may be equipped with a depth-LSTM that scans the hidden states of time-LSTMs for senone (tied triphone states) classification. For example, FIG. 2A is a diagram of a ltLSTM 202 wherein depth-LSTM ("D-LSTM") 222 is used to scan the outputs of time-LSTM ("T-LSTM") 212 across all layers at the current time step to get summarized layer trajectory information for senone classification. The ltLSTM 202 operates along a time axis (white arrow in FIG. 2A) and a depth axis (crosshatched arrow in FIG. 2A). Note that there is no time recurrence in D-LSTM 222 which only occurs in T-LSTM 212. The output of the topmost layer L is classified via a softmax element 232. This architecture decouples the tasks of time recurrence modeling and senone classification for standard LSTMs. Furthermore, the depth-LSTM 222 creates auxiliary connections for gradient flow, thereby making it easier to train deeper LSTMs. This model may achieve significant accuracy improvement as compared to traditional LSTMs or residual LSTMs. Moreover, time-LSTM and depth-LSTM may be evaluated in parallel threads (and depth-LSTM can be evaluated with batching because there is no time recurrence across different frames).

Figure 2B:
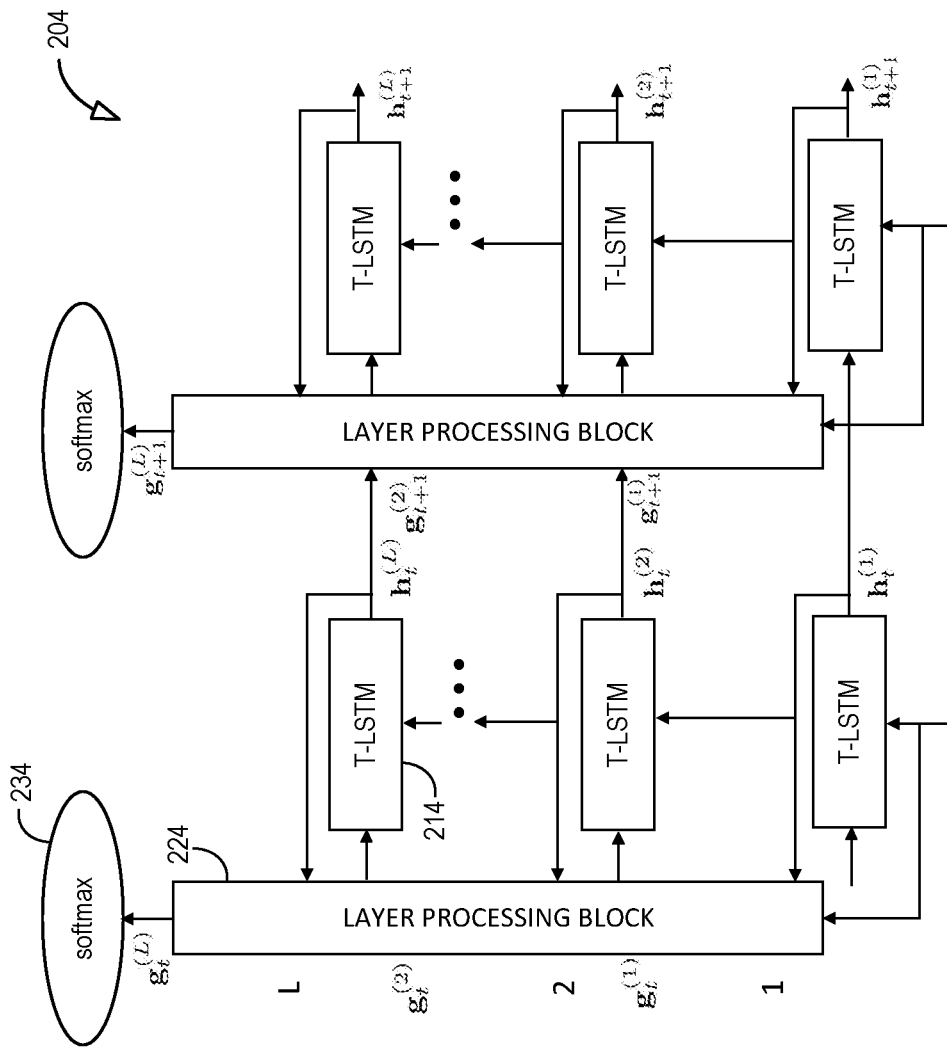
FIG. 2B illustrates layer processing blocks according to some embodiments.

A generalized ltLSTM architecture 204 may be associated with the concept of a depth processing block as illustrated in FIG. 2B. As before, the system 204 includes T-LSTM 214 and a softmax element 234 for classification. In this case, however, the D-LSTM are replaced with layer processing blocks 224. Note that the system 204 differs from a typical LSTM and other variants which operate in a frame-by-frame layer-be-layer fashion. Such an approach may integrate gated feedforward units as well as max-pooling feedforward units designed for the depth processing block with lower computational cost.

The standard LSTM may be referred to as "time-LSTM" because it does temporal modeling via time recurrence by taking the output of a previous time step as an input to the current time step. At time step t, the computation of the l-th layer LSTM block can be described as:

$$i_t^l = \sigma(W_{ix}^l x_t^l + W_{ih}^l h_{t-1}^l + p_i^l \odot c_{t-1}^l + b_i^l) \quad (1)$$

$$f_t^l = \sigma(W_{fx}^l x_t^l + W_{fh}^l h_{t-1}^l + p_f^l \odot c_{t-1}^l + b_f^l) \quad (2)$$

$$c_t^l = f_t^l \odot c_{t-1}^l + i_t^l \odot \phi(W_{cx}^l x_t^l + W_{ch}^l h_{t-1}^l + b_c^l) \quad (3)$$

$$o_t^l = \sigma(W_{ox}^l x_t^l + W_{oh}^l h_{t-1}^l + p_o^l \odot c_t^l + b_o^l) \quad (4)$$

$$h_t^l = o_t^l \odot \phi(c_t^l) \quad (5)$$

Where $x_t^l$ is the input vector for the l-th layer with $$x_t^l = \begin{cases} h_t^{l-1} & \text{if } l > 1 \\ s_t & \text{if } l = 1 \end{cases} \quad (6)$$

$s_t$ is the speech spectrum input at time step t. l=1 ... L, where L is the total number of hidden layers. The vectors $i_t^l$, $o_t^l$, $f_t^l$, $c_t^l$, are the activation of the input, output, forget gates, and memory cells, respectively. $W_{\cdot x}^l$ and $W_{\cdot h}^l$ are the weight matrices for the inputs $x_t^l$ and the recurrent inputs $h_{t-1}^l$, respectively. $b_{\cdot}^l$ are the bias vectors. $p_i^l$, $p_o^l$, $p_f^l$, are parameter vectors associated with peephole connections. The functions $\sigma$ and $\phi$ are the logistic sigmoid and hyperbolic tangent nonlinearity, respectively. The operation $\odot$ represents element-wise multiplication vectors.

The layer trajectory LSTM ("ltLSTM") model of FIG. 2A performs temporal modeling using time-LSTM and senone classification using depth-LSTM separately, which may perform better for acoustic modeling as compared to using time-LSTM alone. The formulation of time-LSTM may be the same as previously described. In the embodiment of FIG. 2A, the l-th layer of the layer LSTM unit can be expressed as:

$$j_t^l = \sigma(U_{jh}^l h_t^l + U_{jg}^l g_t^{l-1} + q_j^l \odot m_t^{l-1} + d_j^l) \quad (7)$$

$$e_t^l = \sigma(U_{eh}^l h_t^l + U_{eg}^l g_t^{l-1} + q_e^l \odot m_t^{l-1} + d_e^l) \quad (8)$$

$$m_t^l = e_t^l \odot m_t^{l-1} + j_t^l \odot \phi(U_{sh}^l h_t^l + U_{sg}^l g_t^{l-1} + d_s^l) \quad (9)$$

$$v_t^l = \sigma(U_{vh}^l h_t^l + U_{vg}^l g_t^{l-1} + q_v^l \odot m_t^l + d_v^l) \quad (10)$$

$$g_t^l = v_t^l \odot \phi(m_t^l) \quad (11)$$

$g_t^l$ is the output of the layer LSTM at time t and layer l. Comparing equations (1) through (5) with equations (7) through (11), note that the biggest difference is that the depth-LSTM takes it previous layer output $g_t^{l-1}$ and the time-LSTM's current layer output $h_t^l$ as inputs, while the time-LSTM takes it previous layer output $h_t^{l-1}$ and previous time step output $h_{t-1}^l$ as inputs.

Note that there is no recurrence in depth-LSTM at different timesteps. The time recurrence only occurs in time-LSTM across time. The structural difference between time-LSTM and depth-LSTM may help them to deal with different aspects of the learning problem, in particular, sequential modeling versus senone classification. Although the total computational cost of the ltLSTM is almost doubled as compared to that using the time-LSTM alone, it can be significantly reduced by using the gated deep neural network units instead of LSTM units for the depth processing Some embodiments described herein may be associated with two approaches to incorporate future context frames into ltLSTMs for higher recognition accuracy. Note that a fixed size vector representation of variable future frames may be obtained, referred to as lookahead embedding, as an additional feature to the network. Moreover, embodiments may utilize a linear transform and/or attention weights for this purpose.

Recall that $h_t^l$ and $g_t^{l-1}$ are the inputs for computing $g_t^l$ in equations (7) through (11), and one may seek to replace either $h_t^l$ and $g_t^{l-1}$ by the lookahead embedding vector in order to incorporate future context information when computing $g_t^l$.

A simple approach to obtaining the embedding vector, denoted as $\eta_t^l$, is to use linear transforms. Suppose there are $\tau$ hidden vectors $h_{t+1:t+\tau}^l$ from the time-LSTM corresponding to the future frames, then the embedding vector may be computed as:

$$\eta_t^l = \Sigma_{\delta=0}^{\tau} H_\delta^l h_{t+\delta}^l \qquad (12)$$

where $H_\delta^l$ is a weight matrix corresponding to the time step $t+\delta$. If the weight it shared across all time steps, it is equivalent to 1 1-D convolutional operation. Note that this sharing approach might not save computation nor improve accuracy. Given the embedding vector, $h_t^l$ may be replaced by $\eta_t^l$ in equations (7) through (11) to calculate $g_t^l$. Equation (12) may be applied to all hidden layers, and this model is referred to as ltLSTM-T$\tau$, where $\tau$ indicates how many future frames are looked ahead in time-LSTM.

Similarly, the embedding vector might be computed from the depth-LSTM, such as:

$$\zeta_t^{l-1} = \Sigma_{\delta=0}^{\tau} G_\delta^{l-1} g_{t+\delta}^{l-1} \qquad (13)$$

where $G_\delta^{l-1}$ denotes the weight matrix, and for clarity, the embedding vector is denoted as $\zeta_t^{l-1}$. In this case, $g_t^{l-1}$ may be replaced by $\zeta_t^{l-1}$ in equations (7) through (11) to compute $g_t^l$. Again, equation (13) may be applied to all hidden layers, and this model may be referred to as ltLSTM-D$\tau$. When both equation (12) and (13) are applied at the same time, the model may be referred to as ltLSTM-T$\tau$D$\tau$.

Figure 2C:
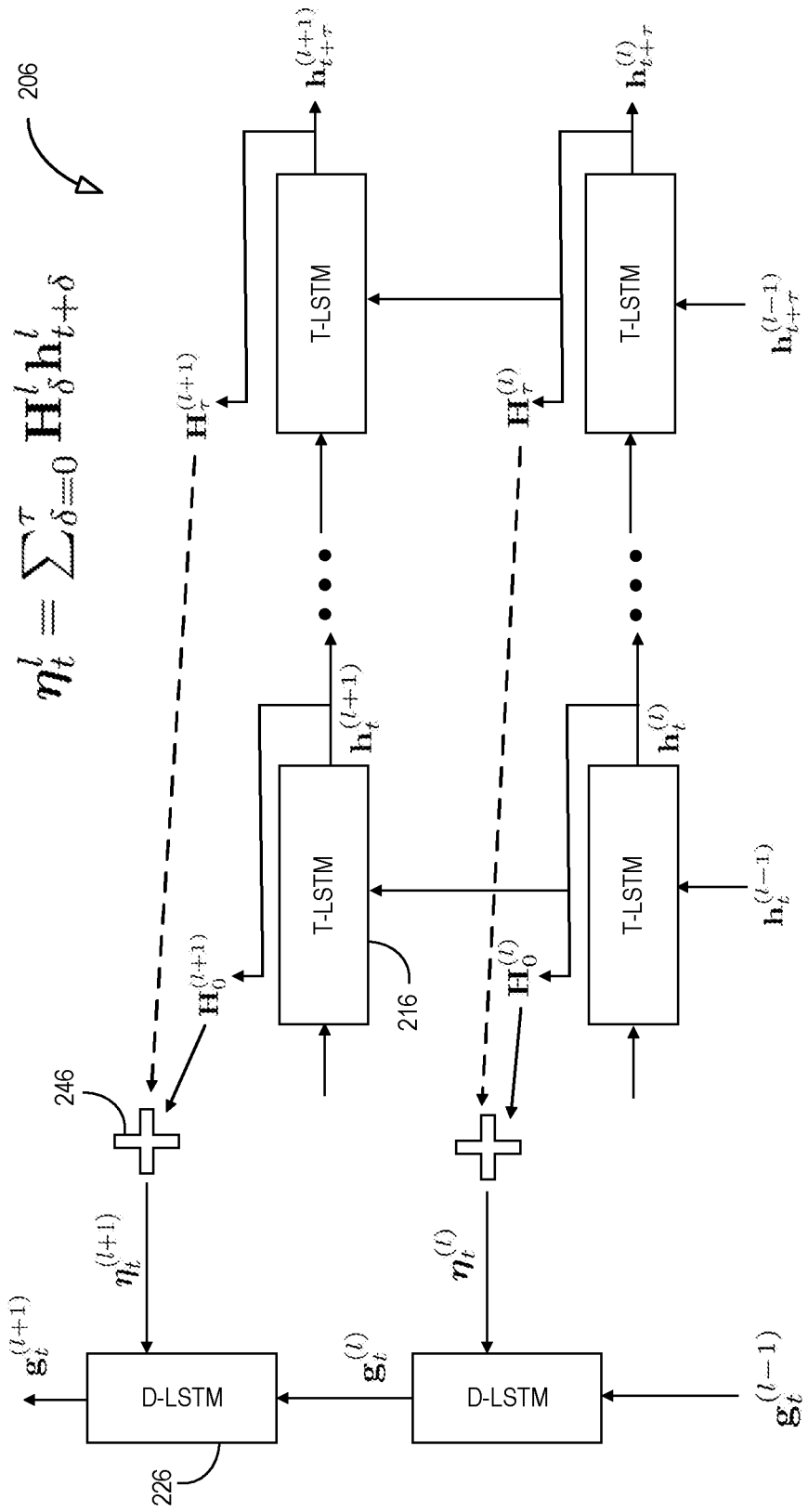
FIG. 2C is a layer trajectory LSTM architecture with context frames from a time layer processing block in accordance with some embodiments.

FIG. 2C is a layer trajectory LSTM architecture 206 with context frames from a time layer processing block (T-LSTM 216) being added 246 for an input to a D-LSTM 226 in accordance with some embodiments. The process used to evaluate the l+1$^{th}$ layer depth-LSTM output when incorporating $\tau$ future frames of hidden vectors from time-LSTM at every layer.

Figure 2D:
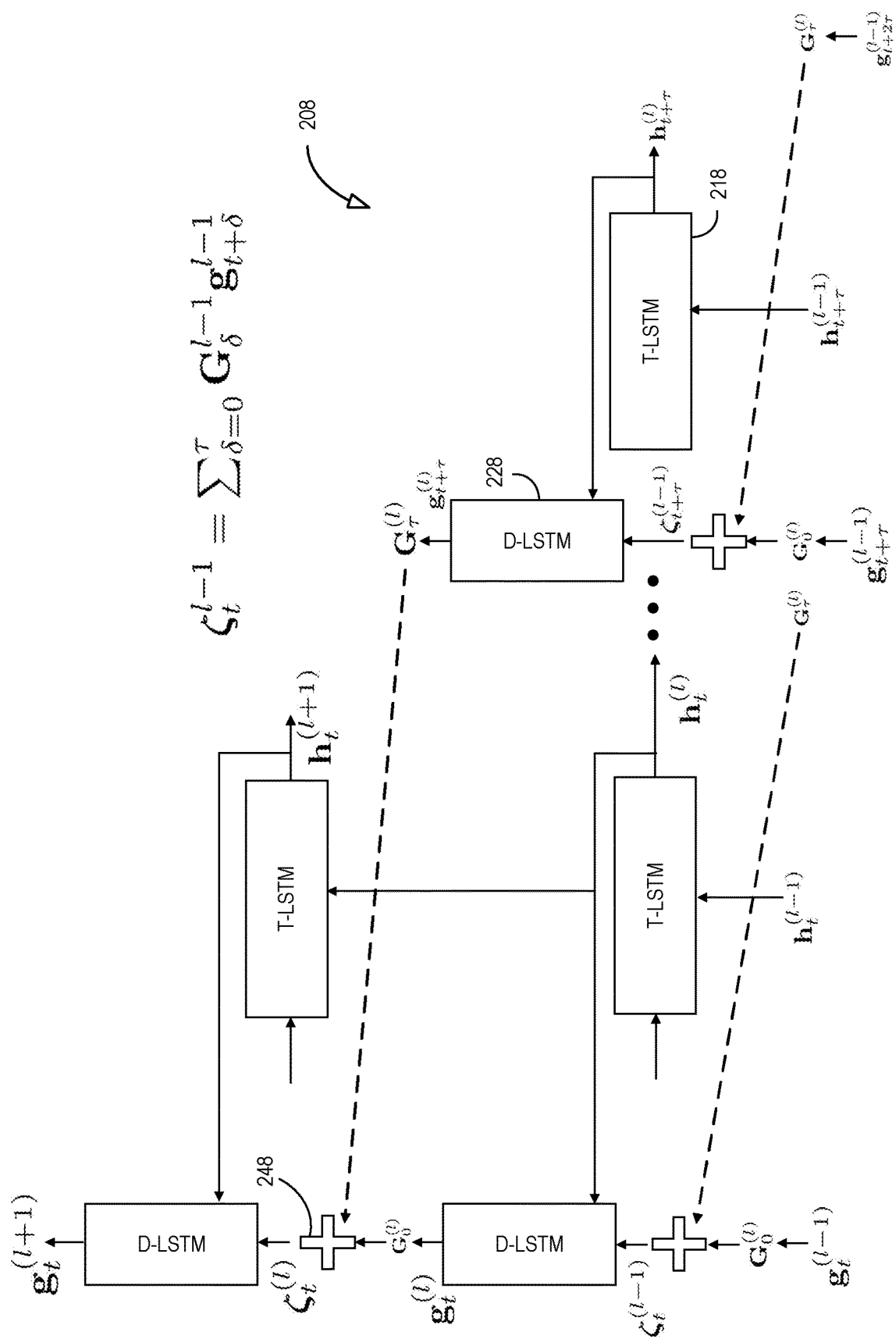
FIG. 2D is a layer trajectory LSTM architecture with context frames from a depth processing block in accordance with some embodiments.

FIG. 2D is a layer trajectory LSTM architecture 208 with context frames from a depth processing block (D-LSTM 228 instead of the T-LSTM 218 as in FIG. 2C) being added 248 for an input to a D-LSTM 228 in accordance with some embodiments. The process used to evaluate the l+1$^{th}$ layer depth-LSTM output when incorporating $\tau$ future frames of hidden vectors from depth-LSTM at every layer.

Thus, FIGS. 2C and 2D show the computational steps to update the l+1$^{th}$ layer depth (D-LSTM) output $g_t^{l+1}$ when incorporating $\tau$ future frames from the T-LSTM and D-LSTM, respectively. When future frames are incorporated from only T-LSTM only (as in FIG. 2C) the evaluation of $g_t^{l+1}$ depends on $g_t^l$ and $\eta_t^{l+1}$ which is generated from $[h_t^{l+1} \ldots h_{t+\tau}^{l+1}]$ as in equation (12). When multiple layers are stacked, there is no latency accumulation, so the total number of lookahead frames in this case is still $\tau$. However, when incorporating future frames from D-LSTM there is latency accumulation when multiple layers are stacked. For an L layer ltLSTM with $\tau$ future context frames, the total number of additional lookahead frames will be L$\tau$.

Another way to incorporate future frames is to use the attention mechanism to generate an embedding vector of a context window with input-dependent weights. This method might, for example, improve the accuracy of Connectionist Temporal Classification ("CTC") modeling in. Note that the attention modeling may be applied to all the hidden layers (and not just the top layer).

Note that attention may be used to calculate $\eta_t^l$ which is then used to replace $h_t^l$ in equations (7) through (11) to calculate $g_t^l$. Embodiments may use a similar process to calculate $\zeta_t^{l-1}$ which is later used to replace $g_t^{l-1}$.

First transform $h_\delta^l$ in a context window for each $\delta \in [t-\tau, t+\tau]$ as:

$$r_\delta = W'_{t-\delta} h_\delta^l. \qquad (14)$$

Then define the energy signal for location-based attention as:

$$e_{t,\delta} = \tan h(Wr_\delta + Vf_{t-1} + b) \qquad (15)$$

where $f_{t-1} = F * \alpha_{t-1}$, with the elements of $\alpha$ being computed using:

$$\alpha_{t,\delta,j} = \frac{\exp(e_{t,\delta,j})}{\sum_{\delta'=t-\tau}^{t+\tau} \exp(e_{t,\delta',j})} \text{ for } j=1,\ldots,n. \qquad (16)$$

Here, $\alpha_{t,\delta,j}$ can be interpreted as the amount of contribution from $r_\delta(j)$ in computing $hc_t^l(j)$. Now, the context vector $hc_t^l$ can be computed using:

$$\eta_t^l = \gamma \Sigma_{\delta=t-\tau}^{t+\tau} (\alpha_{t,\delta} \odot r_\delta). \qquad (17)$$

Hence, the method may comprise a dimension-wise, location-based attention.

Figure 3:
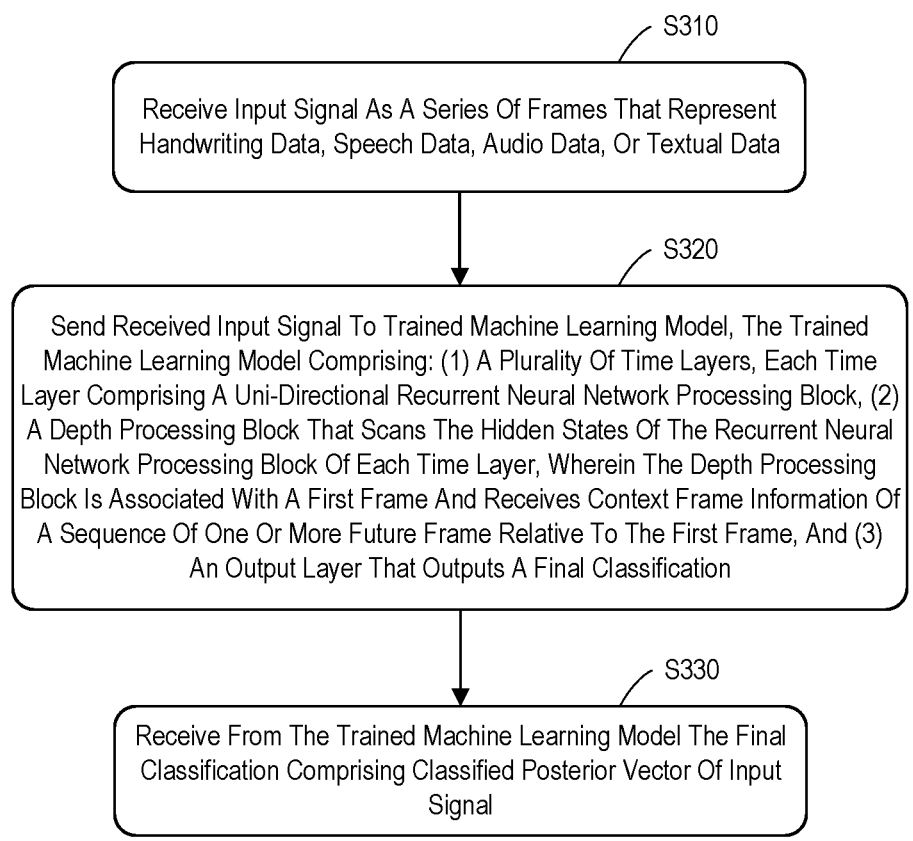
FIG. 3 is a method according to some embodiments.

FIG. 3 is a method according to some embodiments. Note that the flowcharts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S310, the system may receive an input signal as a series of frames that represent handwriting data, speech data, audio data, textual data, etc. At S320, the system may send the received input signal to a trained machine learning model. The trained machine learning model might include, for example, a plurality of time layers (with each time layer comprising a uni-directional recurrent neural network processing block). The trained machine learning model may also include a depth processing block that scans hidden states of the recurrent neural network processing block of each time layer. According to some embodiments, the depth processing block is associated with a first frame and receives context frame information of a sequence of one or more future frames relative to the first frame. The trained machine learning model may further include an output layer that outputs a final classification. At S330, the system may receive (from the trained machine learning model) a final classification comprising a classified posterior vector of the input signal.

While some implementations will be described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
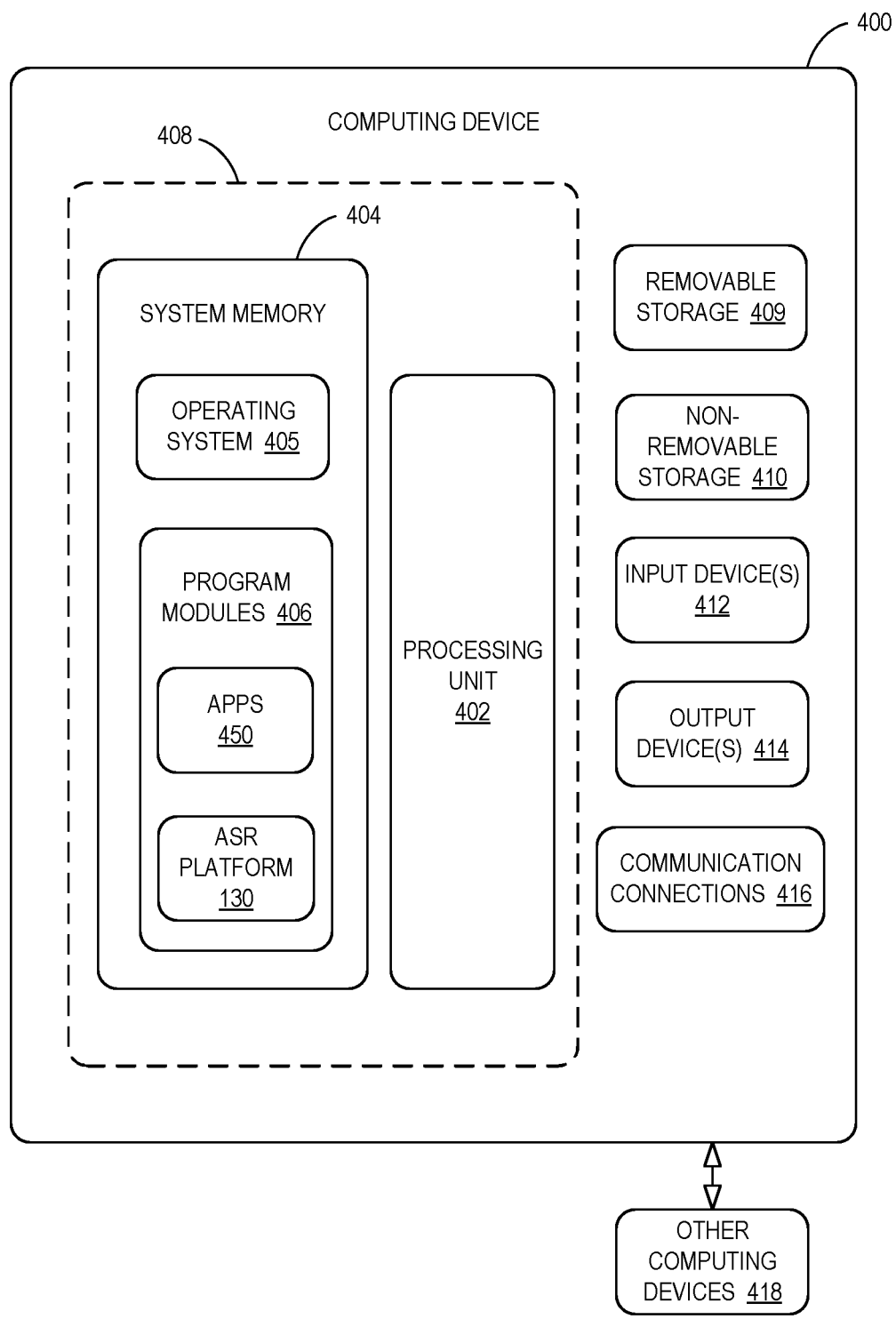
FIG. 4 is a block diagram illustrating example physical components of a computing device in accordance with some embodiments.
Figure 5A:
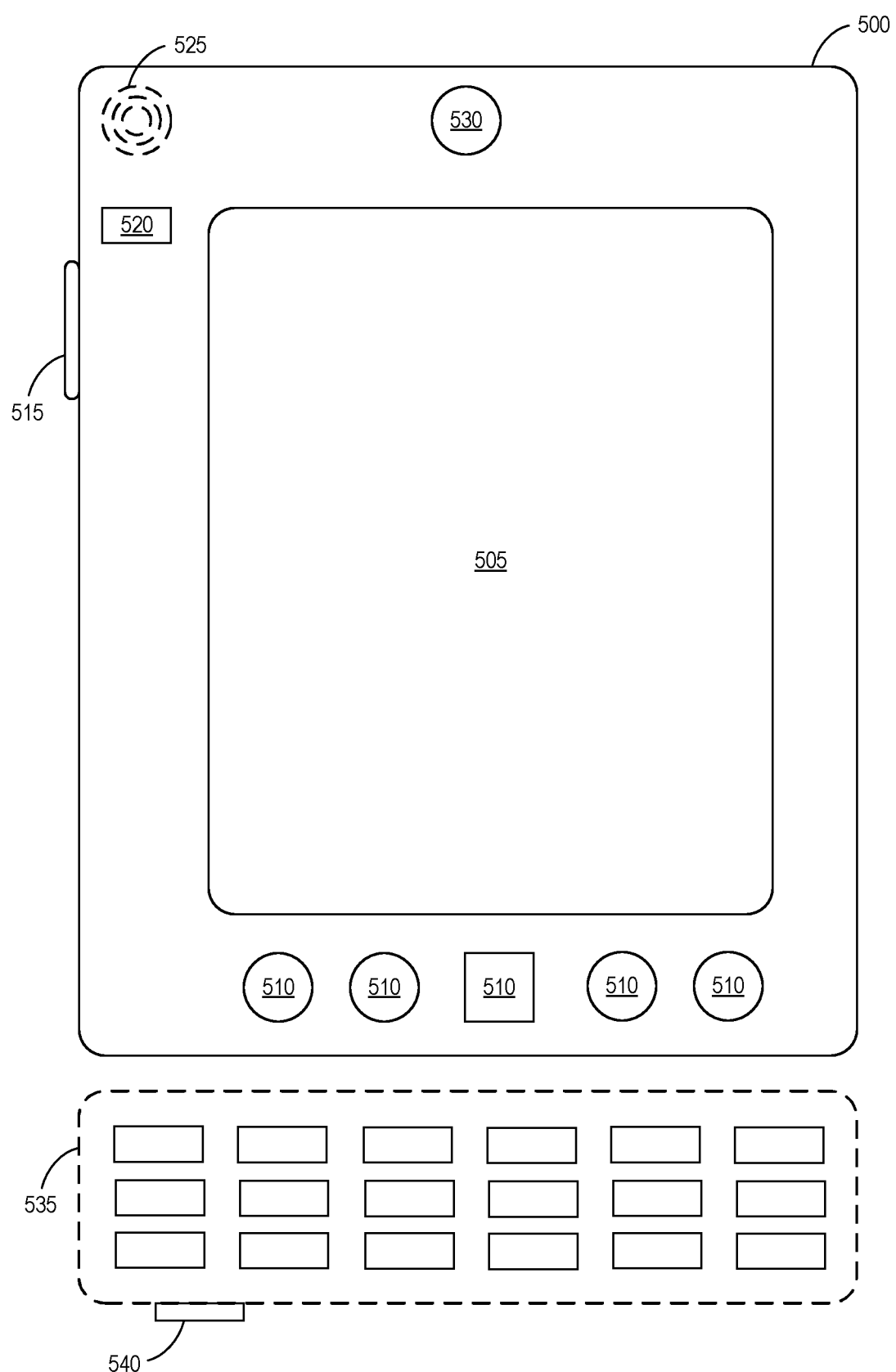
FIGS. 5A and 5B are block diagrams of a mobile computing device according to some embodiments.
Figure 5B:
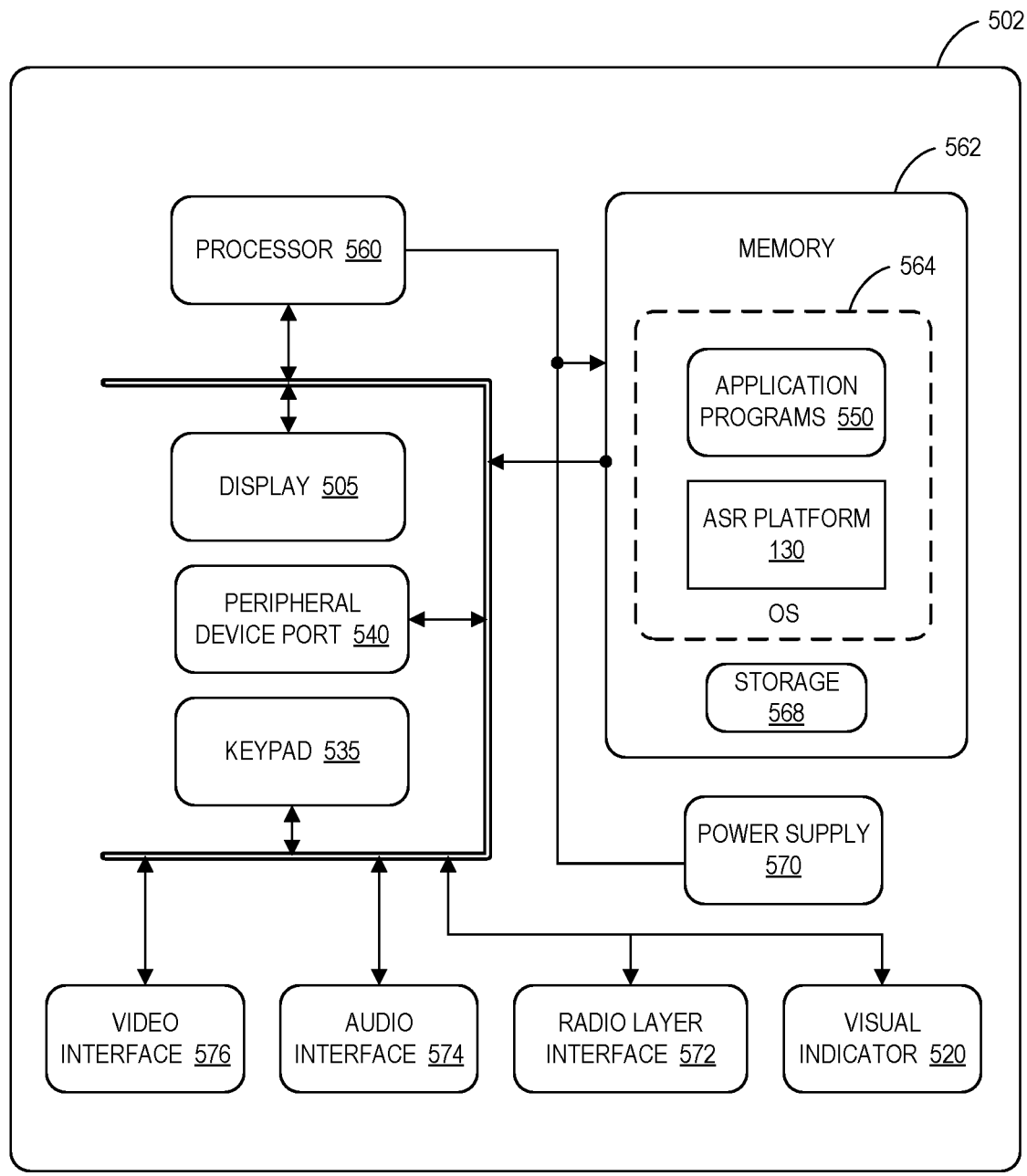
Figure 6:
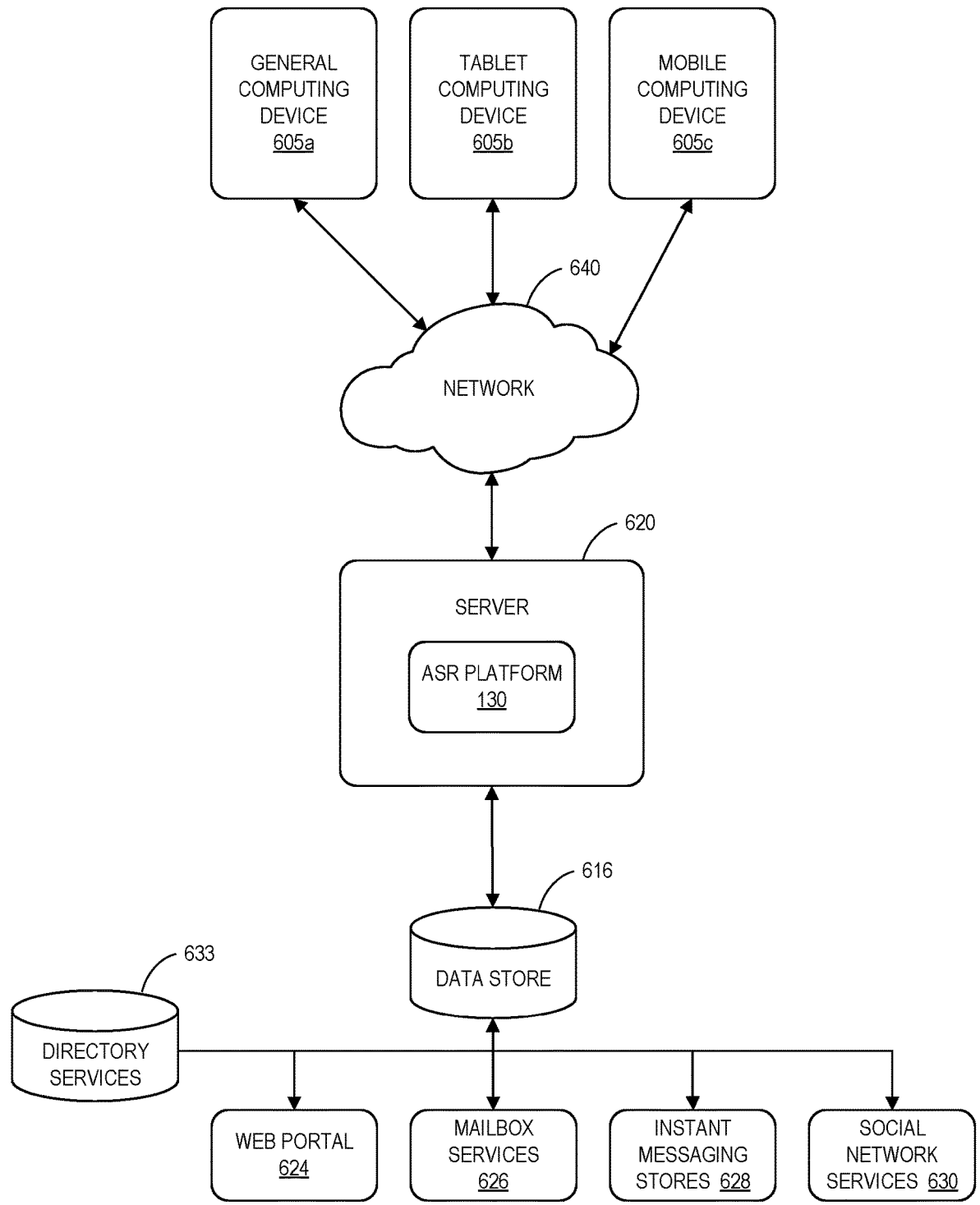
FIG. 6 is a block diagram of a distributed computing system in accordance with some embodiments.

FIGS. 4 through 6 and the associated descriptions provide a discussion of a variety of operating environments in which examples are practiced. However, the devices and systems illustrated and discussed with respect to FIGS. 4 through 6 are for purposes of example and illustration and are not limiting of a vast number of computing device configurations that are used for practicing aspects, described herein.

FIG. 4 is a block diagram illustrating physical components (i.e., hardware) of a computing device 400 with which examples of the present disclosure may be practiced. In a basic configuration, the computing device 400 includes at least one processing unit 402 and a system memory 404. According to an aspect, depending on the configuration and type of computing device, the system memory 404 comprises, but is not limited to, volatile storage (e.g., random access memory), non-volatile storage (e.g., read-only memory), flash memory, or any combination of such memories. According to an aspect, the system memory 404 includes an operating system 405 and one or more program modules 406 suitable for running software applications 450. According to an aspect, the system memory 404 includes the ASR platform 130 in accordance with any of the embodiments described herein. The operating system 405, for example, is suitable for controlling the operation of the computing device 400. Furthermore, aspects are practiced in conjunction with a graphics library, other operating systems, or any other application program, and are not limited to any particular application or system. This basic configuration is illustrated in FIG. 4 by those components within a dashed line 408. According to an aspect, the computing device 400 has additional features or functionality. For example, according to an aspect, the computing device 400 includes additional data storage devices (removable and/or non-removable) such as, for example, magnetic disks, optical disks, or tape. Such additional storage is illustrated in FIG. 4 by a removable storage device 409 and a non-removable storage device 410.

As stated above, according to an aspect, a number of program modules and data files are stored in the system memory 404. While executing on the processing unit 402, the program modules 406 (e.g., ASR platform 130 in accordance with any of the embodiments described herein) perform processes including, but not limited to, one or more of the stages of the method 300 illustrated in FIG. 3. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 400 has one or more input device(s) 412 such as a keyboard, a mouse, a pen, a sound input device, a touch input device, etc. The output device(s) 414 such as a display, speakers, a printer, etc. are also included according to an aspect. The aforementioned devices are examples and others may be used. According to an aspect, the computing device 400 includes one or more communication connections 416 allowing communications with other computing devices 418. Examples of suitable communication connections 416 include, but are not limited to, Radio Frequency ("RF") transmitter, receiver, and/or transceiver circuitry; Universal Serial Bus ("USB"), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) According to an aspect, computer storage media include RAM, ROM, Electrically Erasable Programmable Read-Only Memory ("EEPROM"), flash memory or other memory technology, CD-ROM, Digital Versatile Disks ("DVD") or other optical storage, magnetic cassettes, magnetic tape, magnetic disk storage or other magnetic storage devices, or any other article of manufacture which can be used to store information and which can be accessed by the computing device 400. According to an aspect, any such computer storage media are part of the computing device 400. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, RF, infrared, and other wireless media.

FIGS. 5A and 5B illustrate a mobile computing device 500, for example, a mobile telephone, a smart phone, a tablet personal computer, a laptop computer, and the like, with which aspects may be practiced. With reference to FIG. 5A, an example of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. According to an aspect, the display 505 of the mobile computing device 500 functions as an input device (e.g., a touch screen display). If included, an optional side input element 515 allows further user input. According to an aspect, the side input element 515 is a rotary switch, a button, or any other type of manual input element. In alternative examples, mobile computing device 500 incorporates more or fewer input elements. For example, the display 505 may not be a touch screen in some examples. In alternative examples, the mobile computing device 500 is a portable phone system, such as a cellular phone. According to an aspect, the mobile computing device 500 includes an optional keypad 535. According to an aspect, the optional keypad 535 is a physical keypad. According to another aspect, the optional keypad 535 is a "soft" keypad generated on the touch screen display. In various aspects, the output elements include the display 505 for showing a Graphical User Interface ("GUI"), a visual indicator 520 (e.g., a light emitting diode), and/or an audio transducer 525 (e.g., a speaker). In some examples, the mobile computing device 500 incorporates a vibration transducer for providing the user with tactile feedback. In yet another example, the mobile computing device 500 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 500 incorporates peripheral device port 540, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one example of a mobile computing device. That is, the mobile computing device 500 incorporates a system (i.e., an architecture) 502 to implement some examples. In one example, the system 502 is implemented as a "smart phone" capable of running one or more applications (e.g., browser, e-mail, calendaring, contact managers, messaging clients, games, and media clients/players). In some examples, the system 502 is integrated as a computing device, such as an integrated Personal Digital Assistant ("PDA") and wireless phone.

According to an aspect, one or more application programs 550 are loaded into the memory 562 and run on or in association with the operating system 564. Examples of the application programs include phone dialer programs, e-mail programs, Personal Information Management ("PIM") programs, word processing programs, spreadsheet programs, Internet browser programs, messaging programs, and so forth. According to an aspect, ASR platform 130 in accordance with any of the embodiments described herein and/or one or more speech recognition models may be loaded into memory 562. The system 502 also includes a non-volatile storage area 568 within the memory 562. The non-volatile storage area 568 is used to store persistent information that should not be lost if the system 502 is powered down. The application programs 550 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

According to an aspect, the system 502 has a power supply 570, which is implemented as one or more batteries. According to an aspect, the power supply 570 further includes an external power source, such as an AC adapter or a powered docking cradle that supplements or recharges the batteries.

According to an aspect, the system 502 includes a radio 572 that performs the function of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 550 via the operating system 564, and vice versa.

According to an aspect, the visual indicator 520 is used to provide visual notifications and/or an audio interface 574 is used for producing audible notifications via the audio transducer 525. In the illustrated example, the visual indicator 520 is a Light Emitting Diode ("LED") and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. According to an aspect, the system 502 further includes a video interface 576 that enables an operation of an on-board camera 530 to record still images, video stream, and the like.

According to an aspect, a mobile computing device 500 implementing the system 502 has additional features or functionality. For example, the mobile computing device 500 includes additional data storage devices (removable and/or non-removable) such as, magnetic disks, optical disks, or tape. Such additional storage is illustrated in FIG. 5B by the non-volatile storage area 568.

According to an aspect, data/information generated or captured by the mobile computing device 500 and stored via the system 502 are stored locally on the mobile computing device 500, as described above. According to another aspect, the data are stored on any number of storage media that are accessible by the device via the radio 572 or via a wired connection between the mobile computing device 500 and a separate computing device associated with the mobile computing device 500, for example, a server computer in a distributed computing network, such as the Internet. As should be appreciated such data/information are accessible via the mobile computing device 500 via the radio 572 or via a distributed computing network. Similarly, according to an aspect, such data/information are readily transferred between computing devices for storage and use according to well-known data/information transfer and storage means, including electronic mail and collaborative data/information sharing systems.

FIG. 6 illustrates one example of the architecture of a system for automatic speech recognition as described above. Content developed, interacted with, or edited in association with the ASR platform 130 in accordance with any of the embodiments described herein is enabled to be stored in different communication channels or other storage types. For example, various documents may be stored using a directory service 622, a web portal 624, a mailbox service 626, an instant messaging store 628, or a social networking site 630. The ASR platform 130 in accordance with any of the embodiments described herein is operative to use any of these types of systems or the like for using ltLSTM in connection with ASR. According to an aspect, a server 620 provides the ASR platform 130 in accordance with any of the embodiments described herein to clients 605a, 605b, 605c. As one example, the server 620 is a web server providing the ASR platform 130 in accordance with any of the embodiments described herein over the web. The server 620 provides the ASR platform 130 in accordance with any of the embodiments described herein over the web to clients 605 through a network 640. By way of example, the client computing device is implemented and embodied in a personal computer 605a, a tablet computing device 605b, or a mobile computing device 605c (e.g., a smart phone), or other computing device. Any of these examples of the client computing device are operable to obtain content from the store 616.

Figure 7A:
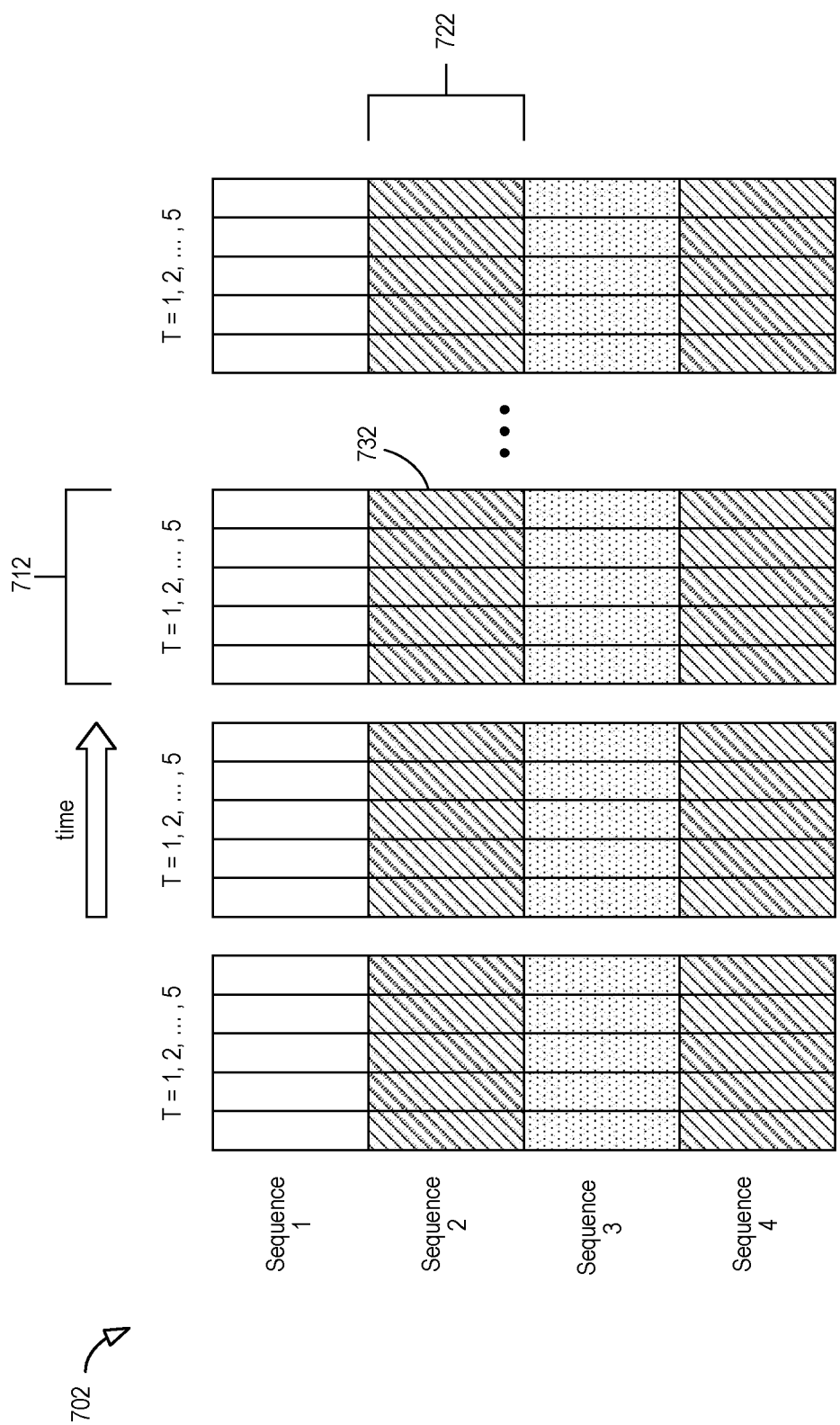
FIGS. 7A and 7B illustrate LSTM training processes according to some embodiments.
Figure 7B:
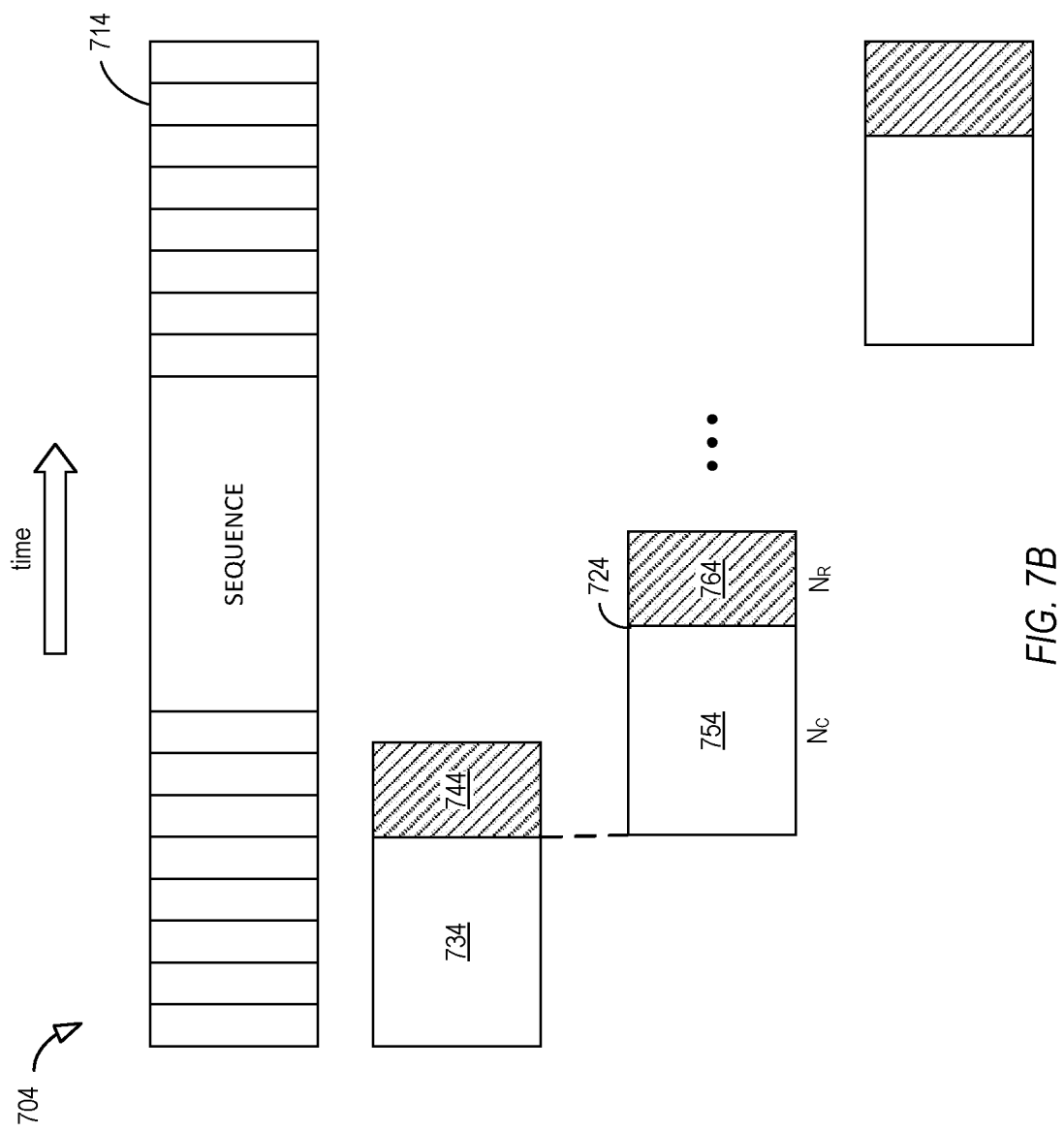

Note that the ASR platform 130 may need to be trained before it can be deployed. FIGS. 7A and 7B illustrate LSTM training processes according to some embodiments. In particular, FIG. 7A shows 702 "chunks" 712 of audio data (each including several sequences 722 or utterances) that are processed via a Back-Propagation Through Time ("BPTT") training process in a chunk-by-chunk fashion. In the example of FIG. 7A, each chunk 712 is associated with five frames of audio data (T=1, ... 5). Note, however, that when processing the frames of a chunk 712, the system may be unable to access information associated with future frames in future chunks 712. For example, when frame T=5 is being evaluated at 732, no data about future frames is available (the information is truncated because they are all in the next chunk 712). To avoid this result, in some embodiments truncation size is increased so that most frames can have full future frame access. Note that such an approach does not impact latency during inference. FIG. 7B illustrates a solution 704 that may be provided to train contextual ltLSTM with a sequence 714 of training frames. In particular, batches 724 of frames are processed such that each batch 724 includes current contextual data 734 ($N_C$) and right contextual data 744 ($N_R$) that provide context information from future frames. After the center contextual data 734 has been used for training, the next batch 724 that is accessed will also include $N_C$ and $N_R$ frames (e.g., 754, 764). Note that the frames of a current batch 724 may "overlap" with the frames that were in the last batch 724.

Figure 8:
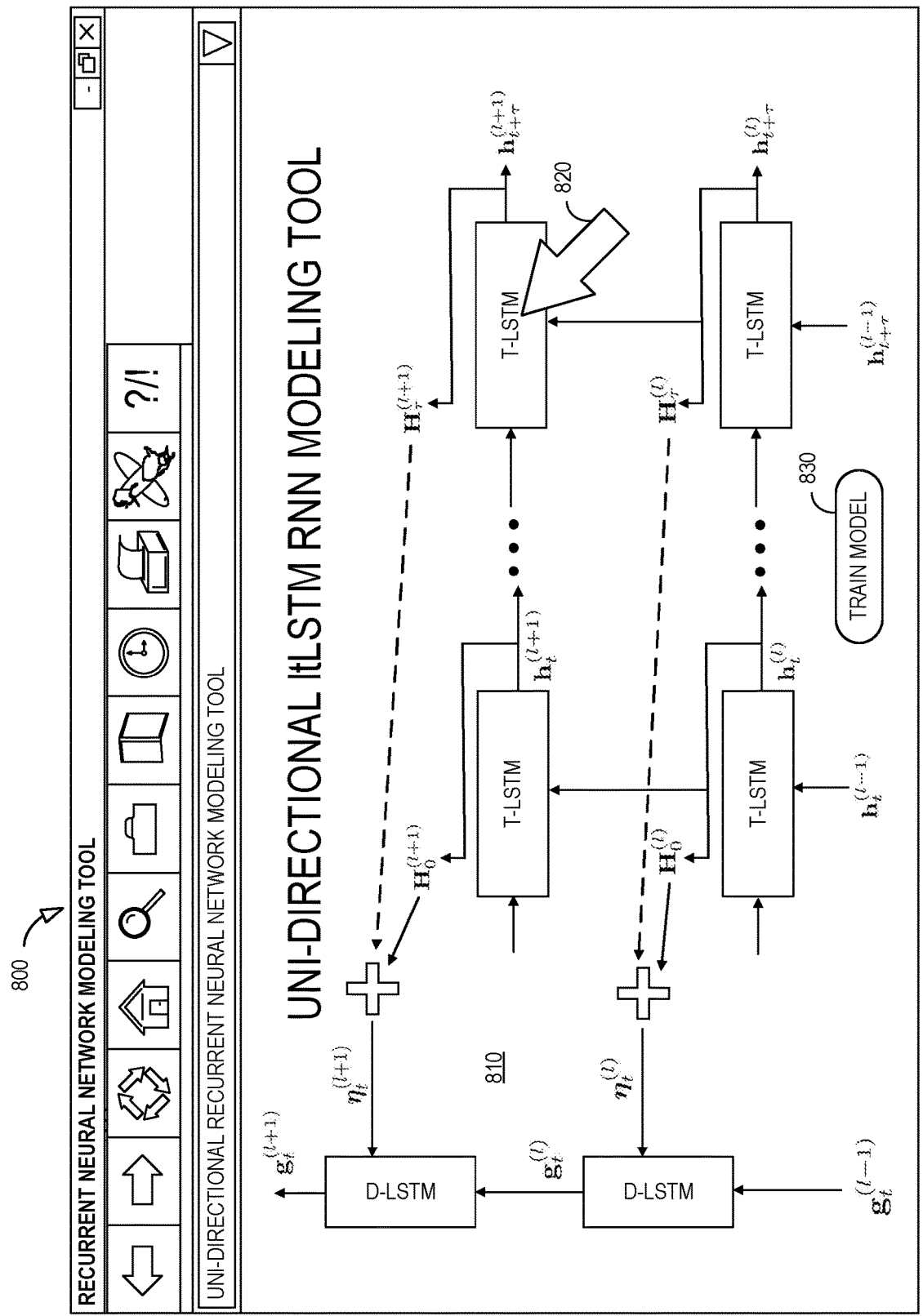
FIG. 8 is an operator or administrator display in accordance with some embodiments.

An operator or administrator may view and/or adjust parameters associated with an ltLSTM with context frames performs CS ASR in accordance with any of the embodiments described herein. For example, FIG. 8 is uni-directional ltLSTM RNN modeling tool display 800 in accordance with some embodiments. The display 800 includes graphical elements 810 representing components of a ltLSTM system (e.g., T-LSTM, D-LSTM, etc.). Selection of various elements 810 (e.g., via a touchscreen or computer mouse pointer 820) may result in a display of additional details about that element 810 (e.g., via pop-up window) and/or provide the operator or administrator with a chance to alter or adjust properties of that element 810. For example, the operator or administrator might adjust model parameters, update training sets, adjust LSTM or DNN configurations, etc. According to some embodiments, selection of a "Train Model" icon might result in updating various ASR model parameters.

Some implementations are described herein with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The effectiveness of ltLSTM modeling using future context frames may be evaluated with baseline models (e.g., a vanilla LSTM, a residual LSTM (ResLSTM), and an ltLSTM without future context frames). The ResLSTM model used a direct shortcut path across layers to alleviate the gradient vanishing issue in the multiple layer LSTM. All models may comprise uni-directional models trained with 30,000 thousand hours of anonymized and transcribed audio data (including data recorded in both close-talk and far-field conditions). The LSTM models used 1,024 hidden units and the output of each LSTM layer was reduced to 512 using a linear projection layer. A softmax layer had 9,404 nodes to model the senone labels. The input feature was an 80-dimension log Mel filter bank for every 10 milliseconds ("ms") of speech. Frame skipping was applied by a factor of 2 to reduce the runtime cost, which corresponds to 20 ms per frame. The language model was a 5-gram with around 100 million (M) ngrams.

All Cross Entropy ("CE") trained models were evaluated with two test sets. Both sets contained mixed close-talk and far-field recordings, with 439,000 (search utterances) and 111,000 words (conversational utterance), respectively. The models were also evaluated on a third test set named "DMA" having 29,000 words from another domain that was unseen during model training Table 1 shows Word Error Rates ("WERs") of all the models. Among LSTMs with different number of layers, the 6-layer model performed the best. When the number of layers was increased to 10, considerable accuracy degradation was observed. The 6-layer ResLSTM was close to the 6-layer LSTM in terms of WERs, and there are consistent improvements when increasing to 10 layers for ResLSTM model (but no further improvement when increasing to 12 layers).

TABLE 1

|  | Search Utterances | Conversation | DMA |
|---|---|---|---|
| 4-layer LSTM | 10.37 | 19.41 | 20.66 |
| 6-layer LSTM | 9.85 | 19.20 | 20.19 |
| 10-layer LSTM | 10.58 | 19.92 | 21.26 |
| 4-layer ResLSTM | 9.99 | 18.85 | 19.49 |
| 6-layer ResLSTM | 9.68 | 18.15 | 18.62 |
| 10-layer ResLSTM | 9.59 | 18.19 | 18.78 |
| 8-layer ltLSTM | 9.28 | 17.47 | 17.61 |
| 6-layer ltLSTM-T4 | 9.15 | 17.17 | 16.68 |
| 6-layer ltLSTM-D4 | 8.78 | 16.51 | 15.53 |
| 6-layer ltLSTM-T4D4 | 8.75 | 16.31 | 15.53 |
| 6-layer ltLSTM-T4 with attention | 8.99 | 17.14 | 17.02 |

The 6-layer ltLSTM outperformed all the LSTM and ResLSTM models, with 9.28%, 17.47%, and 17.61% WERs. This model was used as the baseline model to evaluate the effectiveness of ltLSTM modeling with future context frames.

Initially, the 6-layer ltLSTM-T4 model (which incorporates future 4 frames of time-LSTM output at each layer) achieved 9.15%, 17.17%, and 16.68% WERs on the three test sets. However, adding the attention module did not bring as much improvements as was observed in end-to-end CTC modeling. The reason might be that the attention scheme can relax the hard alignment modeling to alleviate the frame independence assumption of CTC, which may not be a key problem for the hybrid models because the decoding space was constrained with a lexicon and language model.

When incorporating 4 future frames at each layer in depth-LSTM, the 6-layer ltLSTM-D4 model achieved larger improvements, which are 8.78%, 16.51%, 15.58% WERs on the three training sets. This standards for relative 5.4%, 5.5%, and 11.5% WER reductions from the baseline 6-layer ltLSTM and relative 10.9%, 14.9%, and 24.6% WER reductions from the baseline 6-layer LSTM on those three test sets, respectively. It is interesting to see that all of the models with future context frames achieved the largest improvement on the unseen DMA test set. This may be because the future context frames provide more information for unseen scenario to predict senones labels as compared to the baseline models that have already been trained very well to handle matched test data. Adding future frames to both time-LSTM and depth-LSTM, however, only provided a slight improvement over the 6-layer ltLSTM-D4.

Table 2 compares the runtime costs of the baseline 6-layer ltLSTM model and all 6-layer ltLSTM models with future context frames as well as latency requirements in terms of the number of lookahead frames. The ltLSTM baseline model does not use any future context frame, while the ltLSTM-T4 model only requires overall 4 lookahead frames (because it does not have latency accumulation across the depth). Given its accuracy improvement with a small increase in latency, this model is appealing for scenarios that have a strict latency requirement. In contrast, ltLSTM-D4 has a total of 24 lookahead frames due to the context expansion in depth-LSTM. The additional future context information helps to push down the WER further, and it is therefore desirable for applications with less strict latency requirements. Both ltLSTM-T4 and ltLSTM-D4 have 6M more parameters than the baseline ltLSTM model. The ltLSTM-T4 attention model also only requires four lookahead frames, but it is computationally more expensive than the ltLSTM-T4 model.

TABLE 2

|  | lookahead frames | parameters (M) |
|---|---|---|
| ltLSTM | 0 | 57 |
| ltLSTM-T4 | 4 | 63 |
| ltLSTM-D4 | 24 | 63 |
| ltLSTM-T4 Attention | 4 | 69 |
| ltLSTM-T4D4 | 24 | 71 |

Thus, embodiments may provide systems and methods to accurately and efficiently perform ASR. The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

What is claimed is:
1. A system associated with a machine learning model, comprising:
    a processor; and
    a storage device having stored computer-executable instructions which are executable by the processor for causing the computing system to perform the following:
    receive an input signal as a series of frames representing speech data;
    extract speech features from the speech data;
    training a model using the speech features to generate a trained machine learning model, the trained machine learning model comprising:
        a plurality of time layers, each time layer comprising a uni-directional recurrent neural network processing block for performing time recurrence modeling,
        a depth processing block that scans outputs from each of the plurality of time layers at a particular time step to obtain summarized layer trajectory information for senone classification decoupled from the time recurrence modeling, and an output layer that receives the summarized layer trajectory information from the depth processing block and outputs a final senone classification of the speech features as a classified posterior vector of the input signal;

receive from the trained machine learning model the final senone classification; and use the final senone classification to at least (i) further train the trained machine learning model for performing automatic speech recognition, or (ii) to perform automatic speech recognition based on the input signal.

2. The system of claim 1, wherein the depth processing block receives context frame information of a future frame from an output of a time layer processing block of the future frame.

3. The system of claim 1, wherein the depth processing block receives context frame information of a future frame from another depth processing block of the future frame.

4. The system of claim 1, wherein context frame information of a future frame is added to an input of the depth processing block.

5. The system of claim 1, wherein the depth learning block is associated with a deep learning model.

6. The system of claim 5, wherein the deep learning model is associated with at least one of: (i) a deep neural network, (ii) a deep belief network, (iii) a recurrent neural network, and (iv) a convolutional neural network.

7. A computer-implemented machine learning method, comprising:

receiving an input signal as a series of frames representing speech data;

extracting speech features from the speech data;

training a model using the speech features to generate a trained machine learning model, the trained machine learning model comprising:

a plurality of time layers, each time layer comprising a uni-directional recurrent neural network processing block for performing time recurrence modeling, a depth processing block that scans outputs from each of the plurality of time layers at a particular time step to obtain summarized layer trajectory information for senone classification decoupled from the time recurrence modeling, and an output layer that receives the summarized layer trajectory information from the depth processing block and outputs a final senone classification of the speech features as a classified posterior vector of the input signal;

receiving from the trained machine learning model the final senone classification; and using the final senone classification to at least (i) further train the trained machine learning model for performing automatic speech recognition, or (ii) to perform automatic speech recognition based on the input signal.

8. The method of claim 7, wherein the depth processing block receives context frame information of a future frame from an output of a time layer processing block of the future frame.

9. The method of claim 7, wherein the depth processing block receives context frame information of a future frame from another depth processing block of the future frame.

10. The method of claim 7, wherein context frame information of a future frame is added to an input of the depth processing block.

11. The method of claim 7, wherein the input signal is speech data and the output is a senone posterior vector.

12. The method of claim 7, wherein the depth processing block comprises a plurality of LSTM processing blocks, one corresponding to each time layer.

13. The method of claim 7, wherein the depth processing block comprises a plurality of gated DNN processing blocks, one corresponding to each time layer.

14. The method of claim 13, wherein the depth processing block comprises a plurality of softmax DNN processing blocks, one corresponding to each time layer.

15. The method of claim 7, further comprising an attention layer between the depth processing block and the output layer.

16. The method of claim 7, further comprising:

during training of the machine learning model, arranging to make future context frame information available.

17. The method of claim 16, wherein said arranging comprises accessing temporally overlapping chunks training frames.

18. The method of claim 7, wherein the method comprises using the final senone classification as training data for further training the trained machine learning model.

19. The method of claim 7, wherein the output of a first depth processing block is provided as input to a subsequent depth processing block in the machine learning model along with context frame information from either a time layer associated with the subsequent depth processing block or from a preceding time layer that precedes the time layer associated with the subsequent depth processing block in the machine learning model.

20. A computer-readable medium comprising one or more hardware storage devices storing instructions to be executed by a processor to perform a machine learning method, the method comprising:

receiving an input signal as a series of frames representing speech data;

extracting speech features from the speech data;

training a model using the speech features to generate a trained machine learning model, the trained machine learning model comprising:

a plurality of time layers, each time layer comprising a uni-directional recurrent neural network processing block for performing time recurrence modeling, a depth processing block that scans outputs from each of the plurality of time layers at a particular time step to obtain summarized layer trajectory information for senone classification decoupled from the time recurrence modeling, and an output layer that receives the summarized layer trajectory information from the depth processing block and outputs a final senone classification of the speech features as a classified posterior vector of the input signal;

receiving from the trained machine learning model the final senone classification; and using the final senone classification to at least (i) further train the trained machine learning model for performing automatic speech recognition, or (ii) to perform automatic speech recognition based on the input signal.

21. The medium of claim 20, wherein the depth processing block receives context frame information of a future frame from an output of a time layer processing block of the future frame.

22. The medium of claim 20, wherein the depth processing block receives context frame information of a future frame from another depth processing block of the future frame.

* * * * *